United States Patent
Aso

(10) Patent No.: US 7,075,801 B2
(45) Date of Patent: Jul. 11, 2006

(54) DC CONVERTER

(75) Inventor: Shinji Aso, Niiza (JP)

(73) Assignee: Sanken Electric Co., Ltd., Niiza (JP)

( * ) Notice: Subject to any disclaimer, the term of this patent is extended or adjusted under 35 U.S.C. 154(b) by 0 days.

(21) Appl. No.: 10/531,789

(22) PCT Filed: Jun. 1, 2004

(86) PCT No.: PCT/JP2004/007903

§ 371 (c)(1),
(2), (4) Date: Apr. 18, 2005

(87) PCT Pub. No.: WO2005/008871

PCT Pub. Date: Jan. 27, 2005

(65) Prior Publication Data

US 2006/0013020 A1    Jan. 19, 2006

(30) Foreign Application Priority Data

Jul. 16, 2003   (JP) .............................. 2003-197699

(51) Int. Cl.
*H02M 3/335* (2006.01)

(52) U.S. Cl. .............................. 363/21.01; 363/21.13; 363/97

(58) Field of Classification Search .................. 363/16, 363/21.01, 21.05, 21.1, 21.11, 21.13, 21.18, 363/97, 131

See application file for complete search history.

(56) References Cited

U.S. PATENT DOCUMENTS

| 5,841,643 A * | 11/1998 | Schenkel .................. 363/21.13 |
| 6,466,462 B1 * | 10/2002 | Nishiyama et al. ...... 363/21.11 |
| 6,594,161 B1 * | 7/2003 | Jansen et al. ............. 363/21.13 |

FOREIGN PATENT DOCUMENTS

| JP | 07-203688 A | 8/1995 |
| JP | 09-182429 A | 7/1997 |
| JP | 2000-092829 A | 3/2000 |
| JP | 2002-199719 A | 7/2002 |
| JP | 2002-345240 A | 11/2002 |

* cited by examiner

*Primary Examiner*—Jessica Han
(74) *Attorney, Agent, or Firm*—Brenda O. Holmes; Kilpatrick Stockton LLP

(57) ABSTRACT

What is provided is a direct-current converter which improves unstableness of operations owing to an error of a bottom detection circuit and fluctuations of a detection point which are caused by disturbance. The direct-current converter includes a bottom detection circuit 13 which detects a minimum voltage of a main switch Q1 after an auxiliary switch Q2 is switched off, an ideal gate signal generation circuit 21 which generates an ideal gate signal for switching on the main switch Q1 at a time of the minimum voltage of the main switch Q1 based on an output of the bottom detection circuit 13, a comparison circuit 22 which calculates an error output between the ideal gate signal generated by the ideal gate signal generation circuit 21 and an actual gate signal which switches on the main switch Q1, and a first delay circuit 14 which controls a delay of an ON time of the main switch Q1 by the actual gate signal based on the error output of the comparison circuit 22, thereby performing control to make the actual gate signal approach the ideal gate signal.

8 Claims, 9 Drawing Sheets

FIG. 7

| R | S | D | CL | Qn+1 | /Qn+1 |
|---|---|---|----|------|-------|
| L | H | * | *  | H    | L     |
| H | L | * | *  | L    | H     |
| H | H | * | *  | H    | H     |
| L | L | L | ↑  | L    | H     |
| L | L | H | ↑  | H    | L     |
| L | L | * | ↓  | Qn   | /Qn   |

DC CONVERTER

TECHNICAL FIELD

The present invention relates to a direct-current converter which is high-efficiency and low-noise.

BACKGROUND ART

FIG. 1 shows an example of a conventional direct-current converter (Japanese Patent Laid-Open Publication No. 2000-92829). The direct-current converter shown in FIG. 1 has a system called "active clamp". To a direct-current power supply Vin, a main switch Q1 formed of a MOSFET (hereinafter, referred to as an FET) and the like is connected through a primary winding P1 (winding number: n1) of a transformer T. To both ends of the primary winding P1, a series circuit composed of an auxiliary switch Q2 formed of a MOSFET (hereinafter, referred to as an FET) and the like and composed of a snubber capacitor C2 is connected. The main switch Q1 and the auxiliary switch Q2 are configured to be alternately switched on/off by PWM control of a control circuit 111.

Moreover, the primary winding P1 of the transformer T and a secondary winding S1 of the transformer T are wound so as to generate a common mode voltage to each other. To the secondary winding S1 (winding number: n2) of the transformer T, a rectifying/smoothing circuit composed of diodes D10 and D11, a reactor L10 and a capacitor C10 is connected. The rectifying/smoothing circuit rectifies and smoothes a voltage (a pulse voltage of which ON/OFF is controlled) induced by the secondary winding S1 of the transformer T, and outputs a direct-current output to a load 30.

Based on an output voltage of the load 30, the control circuit 111 generates a control signal formed of a pulse for controlling the ON/OFF of the main switch Q1, and controls a duty ratio of the control signal so that the output voltage becomes a predetermined voltage. Moreover, the direct-current converter includes an inverter 112, a bottom detection circuit 113, a first delay circuit 114, a second delay circuit 115, a low-side driver 116, and a high-side driver 117.

The inverter 112 inverts a Q1 control signal Q1c for the main switch Q1 from the control circuit 111, and outputs the inverted Q1 control signal Q1c to the second delay circuit 115. The bottom detection circuit 113 detects the minimum voltage (hereinafter, referred to as a bottom detection signal Btm) of the main switch Q1 after the auxiliary switch Q2 is switched off. The first delay circuit 114 generates a Q1 gate signal Q1g in which rising timing of a Q1 control signal Q1c from the control circuit 111 is delayed to rising timing of the bottom detection signal Btm from the bottom detection circuit 113, and outputs the generated Q1 gate signal Q1g to the low-side driver 116. The low-side driver 116 applies the Q1 gate signal Q1g from the first delay circuit 114 to a gate of the main switch Q1, and drives the main switch Q1. The second delay circuit 115 generates a Q2 gate signal Q2g in which rising timing of the Q2 control signal Q2c for the auxiliary switch Q2, which is inverted by the inverter 112, is delayed by a predetermined time, and outputs the generated Q2 gate signal Q2g to the high-side driver 117. The high-side driver 117 applies the Q2 gate signal Q2g from the second delay circuit 115 to a gate of the auxiliary switch Q2, and drives the auxiliary switch Q2.

Next, operations of the direct-current converter thus configured will be described while referring to a timing chart shown in FIG. 2. In FIG. 2, a voltage Q1v between both ends of the main switch Q1 is shown.

First, when the Q1 control signal Q1c from the control circuit 111 rises to a H level at a time t31, the Q2 control signal Q2c falls to a L level. Accordingly, the Q2 gate signal Q2g falls to the L level, and therefore, the auxiliary switch Q2 is switched off. Moreover, the bottom detection signal Btm rises to the H level at the time t31.

Then, when the auxiliary switch Q2 is switched off, the voltage Q1v of the main switch Q1 is decreased. At a time t32, the minimum value (bottom) of the voltage Q1v is detected by the bottom detection circuit 113. At this time, the bottom detection signal Btm from the bottom detection circuit 113 falls to the L level.

Then, the Q1 gate signal Q1g which rises to the H level at falling timing (time 32) of the bottom detection signal Btm from the bottom detection circuit 113 is generated by the first delay circuit 114, and the Q1 gate signal Q1g is applied to the gate of the main switch Q1 through the low-side driver 116. Accordingly, the main switch Q1 is switched on. Specifically, a bottom-voltage switch or zero-voltage switch of the main switch Q1 can be achieved.

When the main switch Q1 is switched on, a current flows to the main switch Q1 from the direct-current power supply Vin through the primary winding P1 of the transformer T. At this time, the current flows through a cycle of the constituents S1, D10, L10, C10 and S1.

Next, when the main switch Q1 is switched off by the Q1 control signal Q1c at a time t33, a parasitic capacitor (not shown) owned by the main switch Q1 is charged with energy stored in the primary winding P1 of the transformer T and a leakage inductance between the primary and secondary windings of the transformer T, a voltage resonance is formed, and the voltage Q1v of the main switch Q1 rises during a period from the time t33 to a time t34. Moreover, a current flows through a cycle of the constituents L10, C10, D11 and L10, and supplied to a load R30.

Then, when the auxiliary switch Q2 is switched on by the Q2 gate signal Q2g at the time t34, the energy stored in the primary winding P1 of the transformer T is supplied to the capacitor C2, and the capacitor C2 is charged therewith. Next, the energy stored in the capacitor C2 flows through a cycle of the constituents C2, Q2, P1 and C2.

Note that, as a document of a related art of the conventional direct-current converter, for example, Japanese Patent Laid-Open Publication No. H7-203688 (published in 1995) is mentioned.

DISCLOSURE OF THE INVENTION

As described above, in the conventional direct-current converter, the minimum value of the voltage of the main switch Q1 is detected by the bottom detection circuit 113 after the auxiliary switch Q2 is switched off, and the on-delay of the main switch Q1 is controlled so that the Q1 gate signal Q1g rises to the H level at the falling timing of the bottom detection signal Btm. Therefore, when a delay time of the main switch Q1 is varied owing to a detection error of the bottom detection circuit 113 and fluctuations of a detection point which are caused by disturbance, the Q1 gate signal Q1g of the main switch Q1 is varied. Accordingly, the operations of the direct-current converter become very unstable.

Moreover, when there is a delay from the detection of the bottom to the switch-on of the main switch Q1, the switch-on of the main switch Q1 is delayed from the bottom.

Accordingly, it has been necessary to configure such a circuit which reduces the delay from the detection of the bottom to the switch-on of the main switch Q1. Therefore, it has been necessary to switch on the main switch Q1 at high speed, leading to a defect that switching noise is increased, and the like.

It is an object of the present invention to provide a direct-current converter which improves the unstableness of the operations owing to the error of the bottom detection circuit and the fluctuations of the detection point which are caused by the disturbance, is capable of eliminating an influence of the delay from the detection of the bottom to the switch-on of the main switch, and capable of reducing the switching noise.

In order to achieve the above-described object, the present invention is configured as follows. An invention of claim 1 is a direct-current converter which alternately switches on/off a main switch and an auxiliary switch, thereby rectifying and smoothing a voltage of a secondary winding of a transformer, thus obtaining a direct-current output, the main switch being connected in series to a primary winding of the transformer, and the auxiliary switch being of a series circuit connected to both ends of the primary winding of the transformer or both ends of the main switch and composed of a capacitor and the auxiliary switch, comprising: bottom detection means configured to detect a minimum voltage of the main switch after the auxiliary switch is switched off; control signal generation means configured to generate an ideal control signal which switches on the main switch at a time of the minimum voltage of the main switch based on an output of the bottom detection means; error calculation means configured to calculate an error output between the ideal control signal generated by the control signal generation means and an actual control signal which switches on the main switch; and delay control means configured to control a delay of an ON time of the main switch by the actual control signal based on the error output of the error calculation means, thereby performing control to make the actual control signal approach the ideal control signal.

An invention of claim 2 is a direct-current converter which switches on/off a main switch connected in series to a primary winding of a transformer, thereby rectifying and smoothing a voltage of a secondary winding of the transformer, thus obtaining a direct-current output, comprising: bottom detection means configured to detect a minimum voltage of the main switch when a voltage of the main switch is decreased; control signal generation means configured to generate an ideal control signal which switches on the main switch at a time of the minimum voltage of the main switch based on an output of the bottom detection means; error calculation means configured to calculate an error output between the ideal control signal generated by the control signal generation means and an actual control signal which switches on the main switch; and delay control means configured to control a delay of an ON time of the main switch by the actual control signal based on the error output of the error calculation means, thereby performing control to make the actual control signal approach the ideal control signal.

An invention of claim 3 is the direct-current converter according to any one of claims 1 and 2, further comprising: integration means configured to integrate the error output of the error calculation means, wherein the delay control means controls the delay of the ON time of the actual control signal based on an integrated output of the integration means, thereby performing the control to make the actual control signal approach the ideal control signal.

An invention of claim 4 is the direct-current converter according to claim 3, wherein the delay control means comprises: a delay unit which delays a signal for switching on the main switch, the signal being from the control means, by a predetermined time by means of a charging time for a delaying capacitor connected in series to a resistor; and a variable delay unit which applies a difference voltage between the integrated output of the integration means and a reference voltage to the delaying capacitor, thereby shortening the predetermined delay time in response to the difference voltage, and the delay control means applies the actual control signal to a control terminal of the main switch based on a voltage of the delaying capacitor.

An invention of claim 5 is the direct-current converter according to any one of claims 1 to 4, wherein a direct-current power supply or a rectified voltage unit which obtains a rectified voltage by rectifying an alternating-current voltage of an AC power supply is connected to both ends of a series circuit composed of the primary winding of the transformer and the main switch.

BRIEF DESCRIPTION OF DRAWINGS

FIG. 7 is a view showing a truth table of a D-type flip-flop as an ideal gate signal generation circuit in the direct-current converter according to the second embodiment.

BEST MODE FOR CARRYING OUT THE INVENTION

Embodiments of a direct-current converter according to the present invention will be described below in detail with reference to the drawings.

FIRST EMBODIMENT

Figure 3:
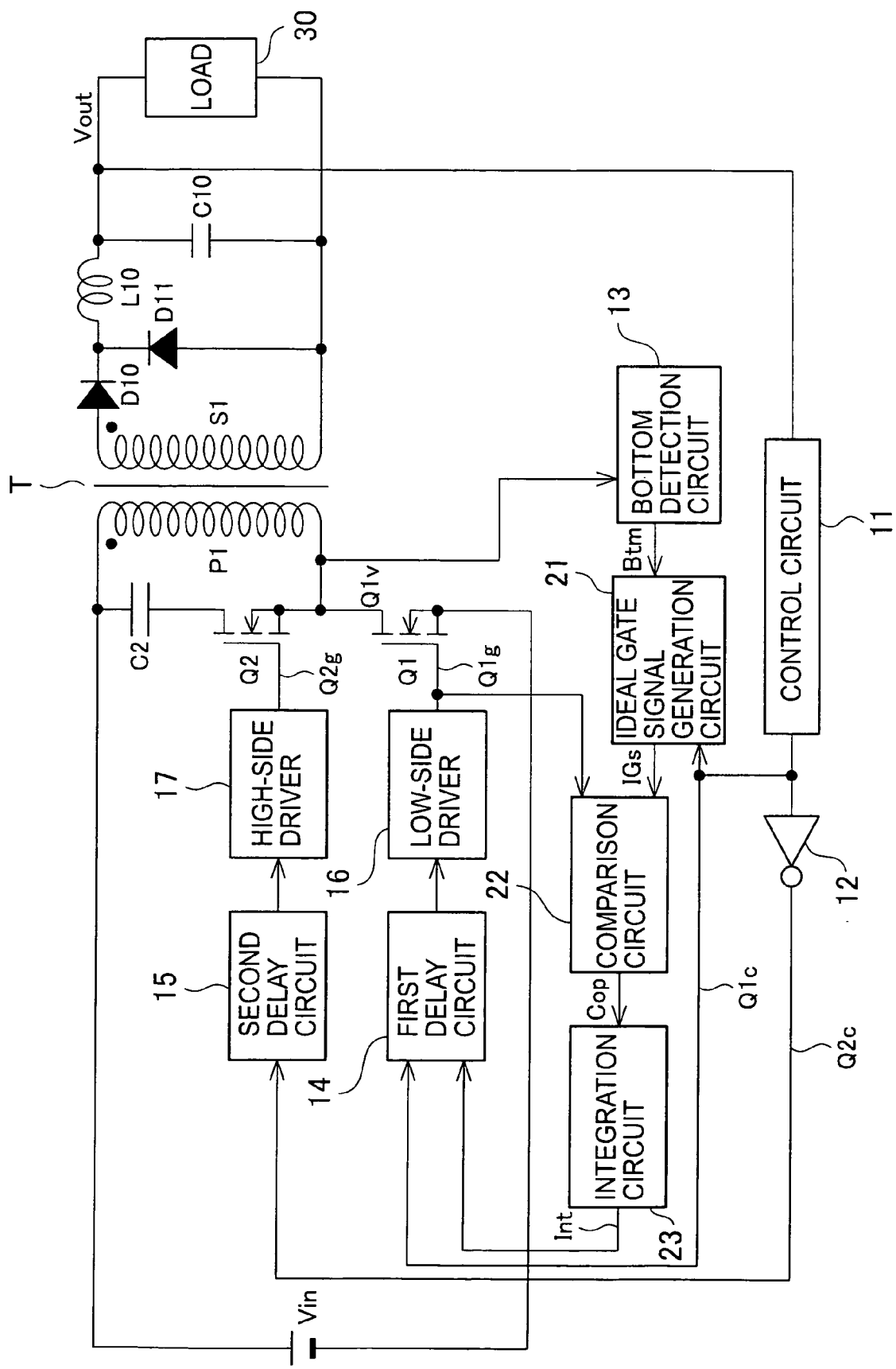
FIG. 3 is a circuitry diagram showing a direct-current converter according to a first embodiment.

FIG. 3 is a circuitry diagram of a direct-current converter according to a first embodiment. In the direct-current converter shown in FIG. 3, a main switch Q1 and an auxiliary switch Q2 are configured to be alternately switched on/off by PWM control of a control circuit 11. Based on an output voltage of a load 30, the control circuit 11 generates a control signal formed of a pulse for controlling ON/OFF of the main switch Q1, and controls a duty ratio of the control signal so that the output voltage becomes a predetermined voltage.

Moreover, the direct-current converter includes an inverter 12, a bottom detection circuit 13, a first delay circuit 14, a second delay circuit 15, a low-side driver 16, a high-side driver 17, an ideal gate signal generation circuit 21, a comparison circuit 22, and an integration circuit 23.

The inverter 12 inverts a Q1 control signal Q1c for the main switch Q1 from the control circuit 11, and outputs the inverted Q2 control signal Q2c to the second delay circuit 15. The bottom detection circuit 13 detects the minimum voltage (hereinafter, referred to as a bottom detection signal Btm) of the main switch Q1 after the auxiliary switch Q2 is switched off. The ideal gate signal generation circuit 21 generates an ideal gate signal IGs based on the bottom detection signal Btm from the bottom detection circuit 13 and the Q1 control signal Q1c from the control circuit 11.

The comparison circuit 22 compares the ideal gate signal IGs from the ideal gate signal generation circuit 21 and an actual Q1 gate signal Q1g for driving the main switch Q1 with each other, and calculates an error output Cop between the ideal gate signal IGs and the actual Q1 gate signal Q1g. The integration circuit 23 integrates the error output Cop from the comparison circuit 22, and outputs an integrated output Int.

The first delay circuit 14 corresponds to delay control means of the present invention. The first delay circuit 14 receives the integrated output Int of the integration circuit 23 and the Q1 control signal Q1c of the control circuit 11, and performs control to shorten a delay time from a rising time of the Q1 control signal Q1c to a rising time of the Q1 gate signal Q1g in response to a value of the integrated output Int from the integration circuit 23. Specifically, the first delay circuit 14 controls the delay of the rising time (ON time) of the actual Q1 gate signal Q1g, thereby performing control to make the actual Q1 gate signal Q1g approach the ideal gate signal IGs.

The low-side driver 16 applies the Q1 gate signal Q1g from the first delay circuit 14 to the gate of the main switch Q1, and drives the main switch Q1. The second delay circuit 15 generates a Q2 gate signal Q2g in which rising timing of the Q2 control signal Q2c for the auxiliary switch Q2, which is inverted by the inverter 12, is delayed by a predetermined time, and outputs the generated Q2 gate signal Q2g to the high-side driver 17. The high-side driver 17 applies the Q2 gate signal Q2g from the second delay circuit 15 to a gate of the auxiliary switch Q2, and drives the auxiliary switch Q2.

Figure 1:
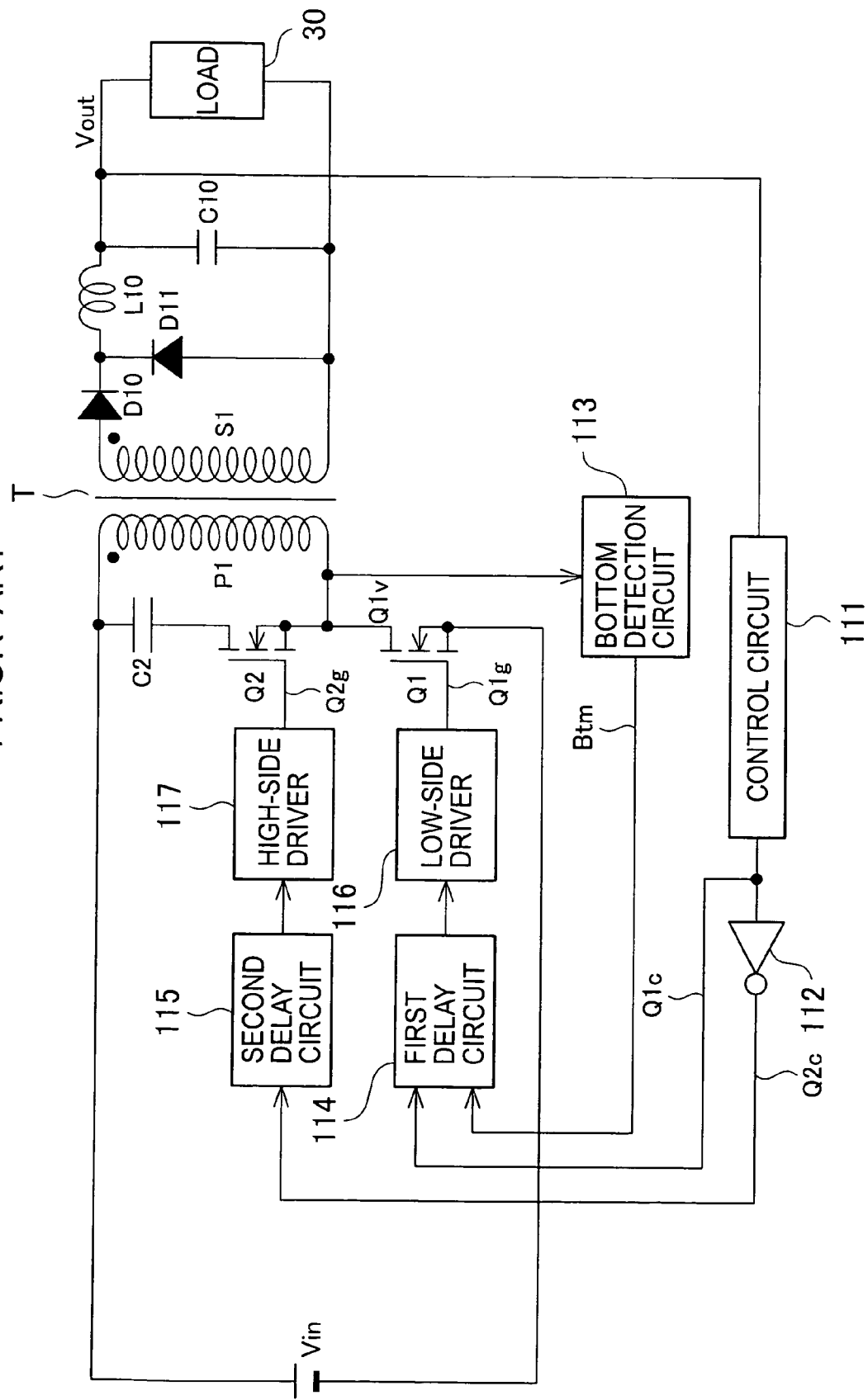
FIG. 1 is a circuit diagram showing an example of a conventional direct-current converter.
Figure 2:
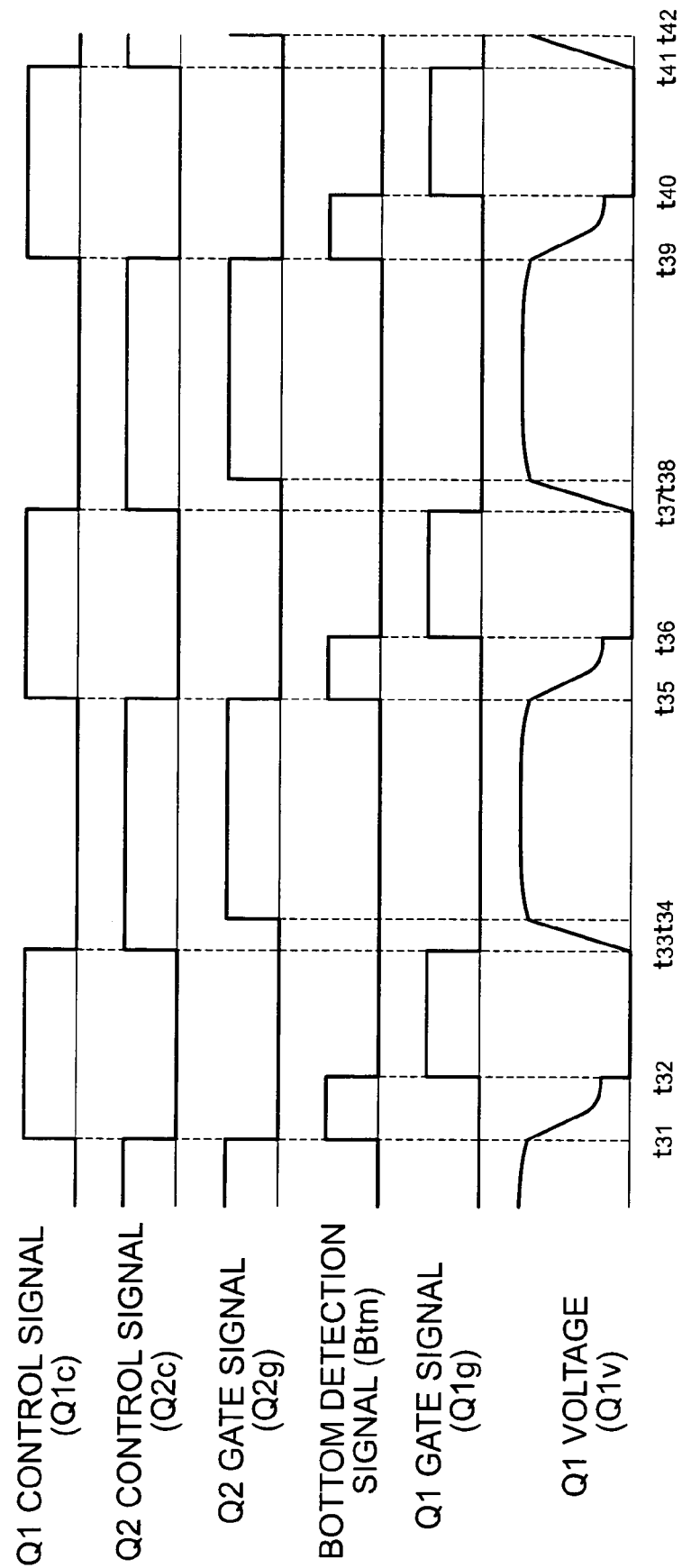
FIG. 2 is a timing chart of signals of respective portions of the conventional direct-current converter.

Note that, in FIG. 3, the same reference numerals are assigned to the same portions as constituent portions shown in FIG. 1, and description thereof is omitted.

Figure 4:
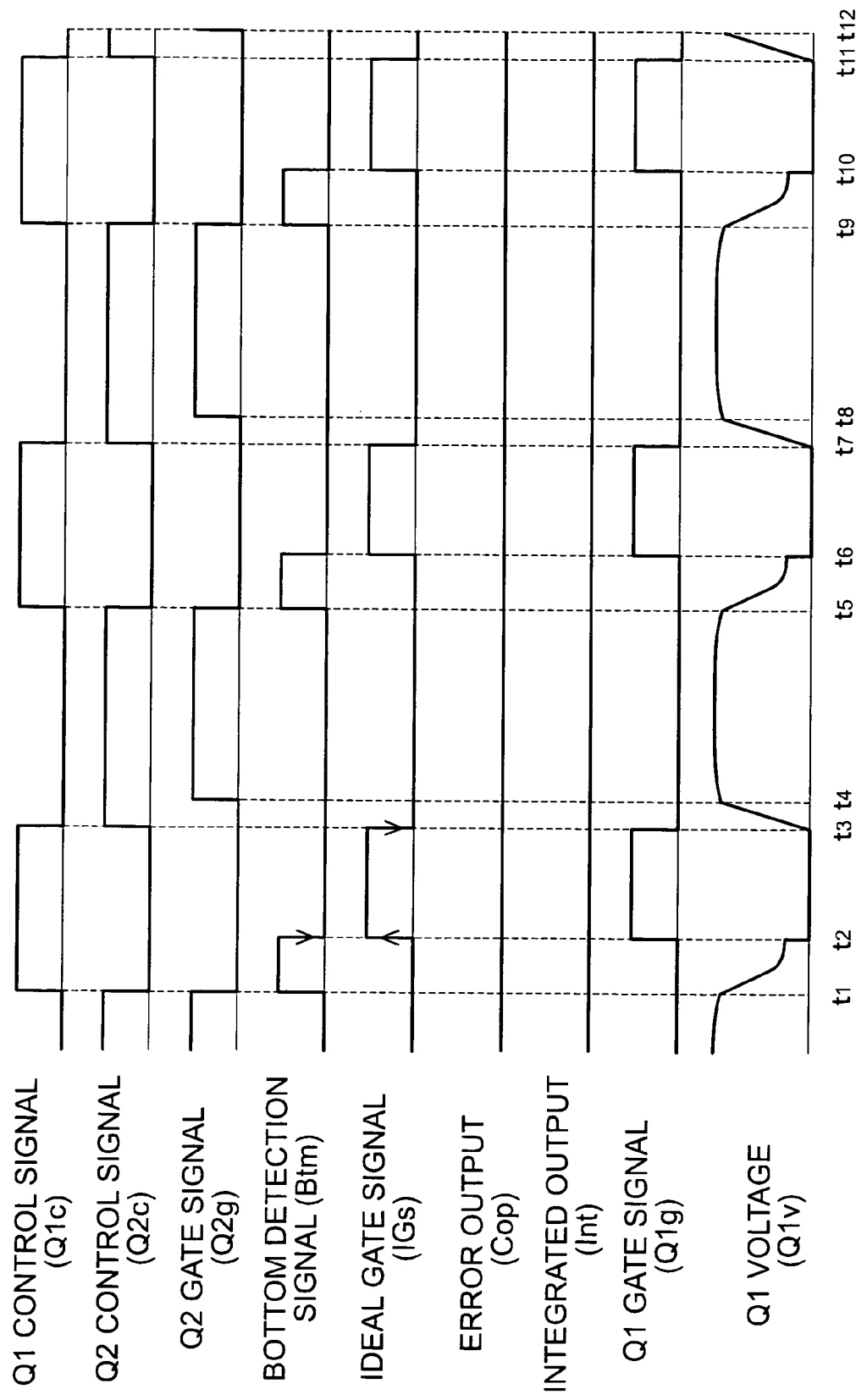
FIG. 4 is a timing chart of signals of respective portions during a steady state where an error between an ideal gate signal and an actual gate signal disappears in the direct-current converter according to the first embodiment.
Figure 5:
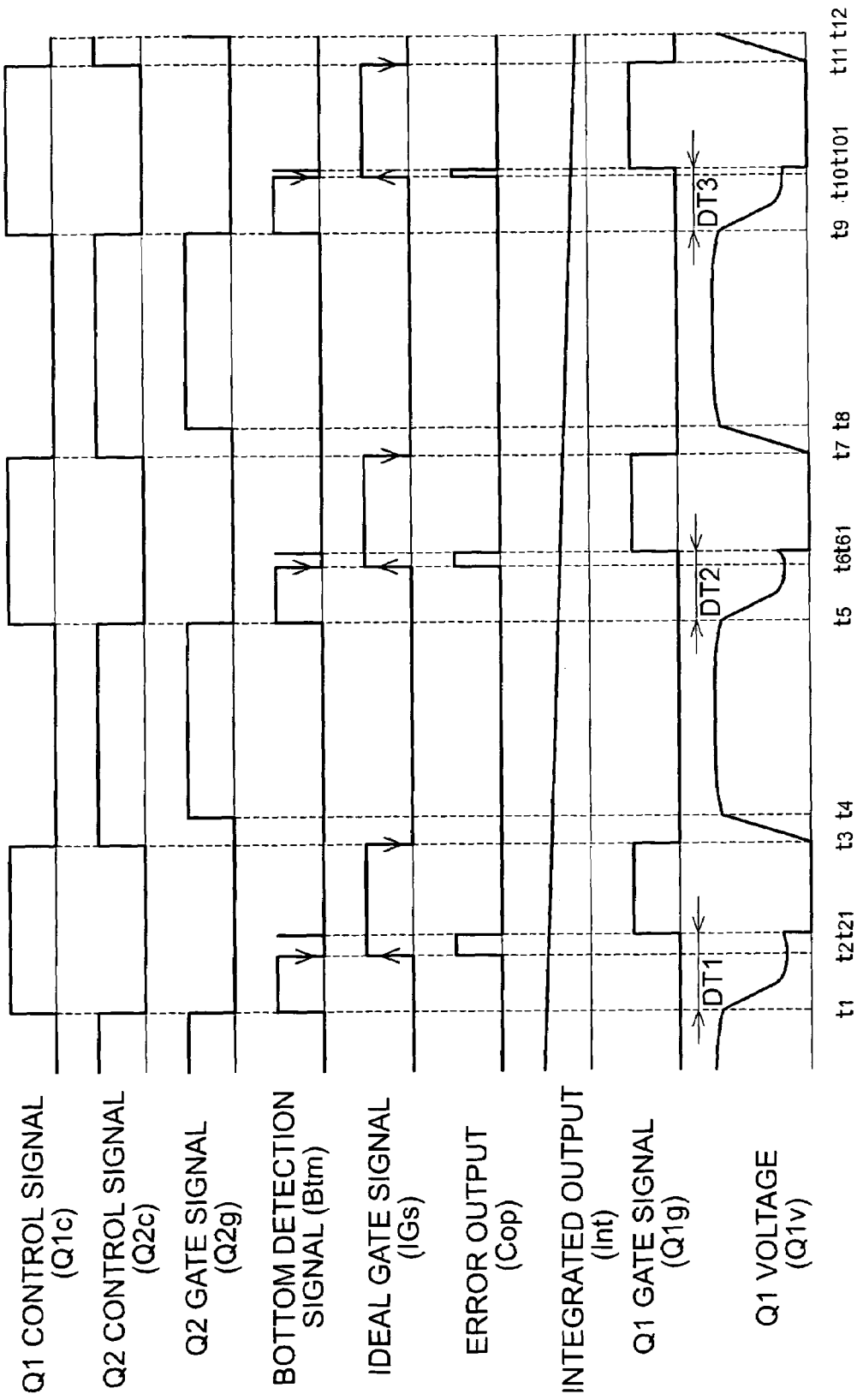
FIG. 5 is a timing chart of signals of the respective portions during a transient state where the actual gate signal approaches the ideal gate signal owing to the error between the ideal gate signal and the actual gate signal in the direct-current converter according to the first embodiment.

Next, operations of the direct-current converter thus configured will be described while referring to flowcharts shown in FIG. 4 and FIG. 5. FIG. 4 is a timing chart of signals of the respective portions during a steady state where the error between the ideal gate signal and the actual gate signal disappears in the direct-current converter according to the first embodiment. FIG. 5 is a timing chart of signals of the respective portions during a transient state where the actual gate signal approaches the ideal gate signal owing to the error between the ideal gate signal and the actual gate signal in the direct-current converter according to the first embodiment. Note that FIG. 4 and FIG. 5 show a voltage Q1v between both ends of the main switch Q1.

First, when the Q1 control signal Q1c from the control circuit 11 rises to a H level at a time t1, the Q2 control signal Q2c falls to a L level. Accordingly, the Q2 gate signal Q2g falls to the L level, and therefore, the auxiliary switch Q2 is switched off. Moreover, the bottom detection signal Btm rises to the H level at the time t1.

Then, when the auxiliary switch Q2 is switched off, the voltage Q1v of the main switch Q1 is decreased. At a time t2, the minimum value (bottom) of the voltage Q1v is detected by the bottom detection circuit 13. At this time, the bottom detection signal Btm from the bottom detection circuit 13 falls to the L level.

Then, the ideal gate signal IGs which rises to the H level at the falling time t2 of the bottom detection signal Btm from the bottom detection circuit 13 is generated by the ideal gate signal generation circuit 21. Moreover, the error output Cop between the ideal gate signal IGs and the actual Q1 gate signal Q1g is calculated by the comparison circuit 22. Specifically, as shown in FIG. 5, the error output Cop is formed of a pulse having a pulse width from a rising time (for example, time t2) of the ideal gate signal IGs to the rising time (for example, time t21) of the actual Q1 gate signal Q1g.

Moreover, the error output Cop from the comparison circuit 22 is integrated by the integration circuit 23, and accordingly, the integrated output Int becomes a value directly proportional to a magnitude of the error output Cop. Next, the first delay circuit 14 performs the control to shorten the delay time from the rising time of the Q1 control signal Q1c to the rising time of the Q1 gate signal Q1g in response to the value of the integrated output Int from the integration circuit 23. For example, during a period from the time t2 to the time t21, the integrated output Int is relatively large, and accordingly, the control is performed to shorten a delay time DT1 from the rising time t1 of the Q1 control signal Q1c to the rising time t21 of the Q1 gate signal Q1g. Therefore, at timing in the next cycle, the delay time becomes a delay time DT2 from a rising time t5 of the Q1 control signal Q1c to a rising time t61 of the Q1 gate signal Q1g.

Furthermore, at the next timing, the delay time becomes a delay time DT3 from a rising time t9 of the Q1 control signal Q1c to arising time t101 of the Q1 gate signal Q1g. Specifically, the control is performed for the delay of the rising time (ON time) of the actual Q1 gate signal Q1g, and the actual Q1 gate signal Q1g is made to approach the ideal gate signal IGs. Moreover, when the difference between the actual Q1 gate signal Q1g and the ideal gate signal IGs disappears, the timing chart as shown in FIG. 4 appears.

Next, at the time t21, the Q1 gate signal Q1g is applied to the gate of the main switch Q1 through the low-side driver 16, and accordingly, the main switch Q1 is switched on. Specifically, a bottom-voltage switch or zero-voltage switch of the main switch Q1 can be achieved.

When the main switch Q1 is switched on, a current flows from a direct-current power supply Vin to the main switch Q1 through the primary winding P1 of the transformer T. At this time, the current flows through a cycle of the constituents S1, D10, L10, C10, and S1.

Next, when the main switch Q1 is switched off by the Q1 control signal Q1c at a time t3, a parasitic capacitor (not shown) owned by the main switch Q1 is charged with energy stored in the primary winding P1 of the transformer T and a leakage inductance between the primary and secondary windings of the transformer T, a voltage resonance is formed, and the voltage Q1v of the main switch Q1 rises during a period from the time t3 to a time t4. Moreover, a current flows through a cycle of the constituents L10, C10, D11 and L10, and supplied to a load R30.

Moreover, the Q2 gate signal Q2g in which the rising time of the Q2 control signal Q2c for the auxiliary switch Q2, which is inverted by the inverter 12, is delayed by the predetermined time is generated by the second delay circuit 15. At the time t4, the Q2 gate signal Q2g is applied to the gate of the auxiliary switch Q2 through the high-side driver 17, and switches on the auxiliary switch Q2. Therefore, the energy stored in the primary winding P1 of the transformer T is supplied to a capacitor C2, and the capacitor C2 is charged therewith. Next, the energy stored in the capacitor C2 flows through a cycle of the constituents C2, Q2, P1 and C2.

As described above, according to the direct-current converter according to the first embodiment, the error between the actual Q1 gate signal Q1g and the ideal gate signal IGs is integrated, and the control is performed to make the actual Q1 gate signal Q1g approach the ideal gate signal IGs. In such a way, unstableness of the operations owing to an error of the bottom detection circuit 13 and fluctuations of a detection point which are caused by disturbance can be improved, and stable operations can be obtained. Moreover, an influence of the delay from the detection of the bottom to the generation of the Q1 gate signal Q1g can be eliminated, and accordingly, it is not necessary to switch on the main switch Q1 at high speed, and switching noise can be reduced.

SECOND EMBODIMENT

Figure 6:
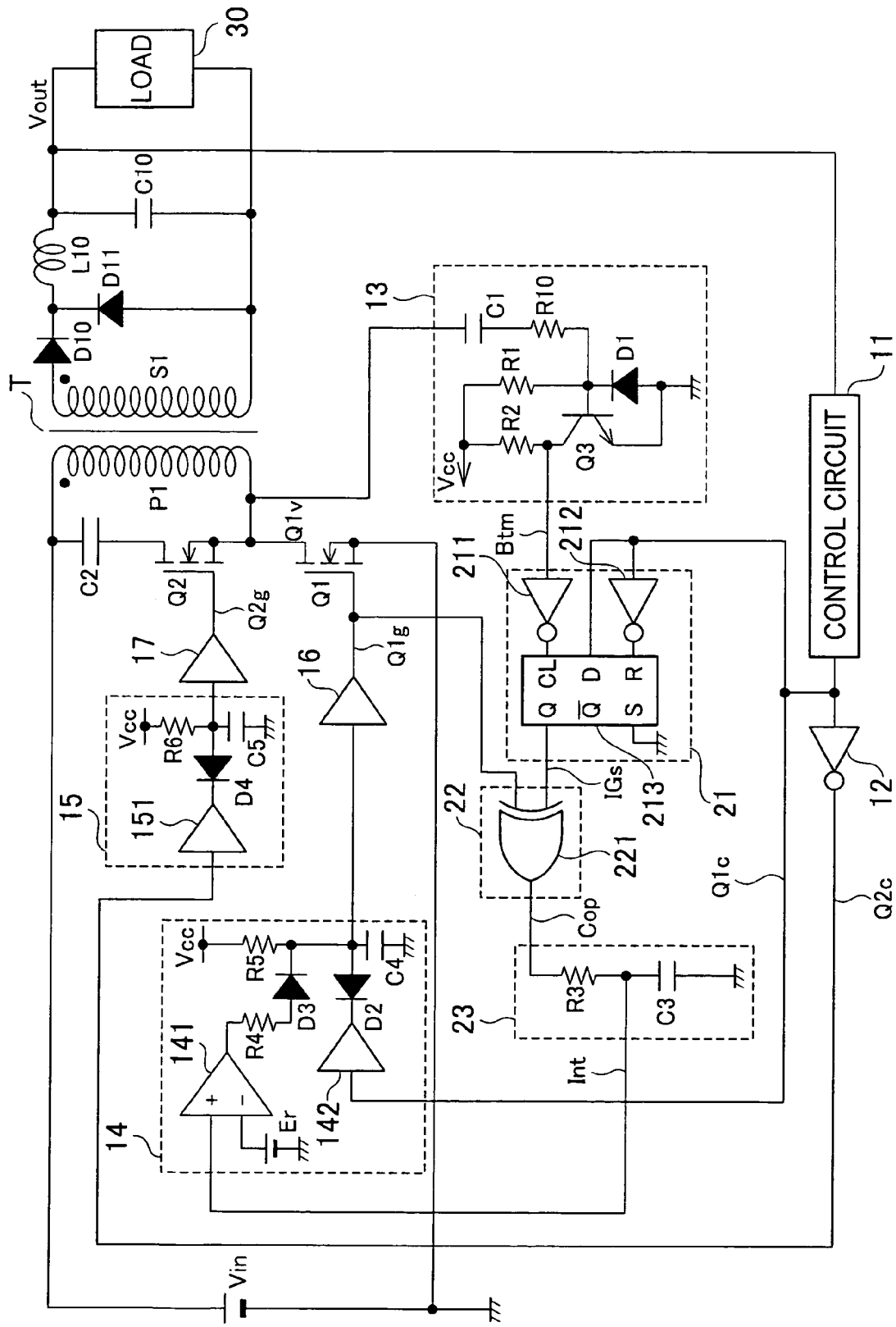
FIG. 6 is a circuitry diagram showing a direct-current converter according to a second embodiment.

FIG. 6 is a circuitry diagram of a direct-current converter according to a second embodiment. The direct-current converter according to the second embodiment, which is shown in FIG. 6, provides a specific circuit example of the direct-current converter according to the first embodiment.

In the bottom detection circuit 13 shown in FIG. 6, a cathode of a diode D1, one end of a resistor R1 and one end of a resistor R10 are connected to a base of a transistor Q3, and an emitter of the transistor Q3 is connected to an anode of the diode D1, and grounded. One end of a resistor R2 is connected to a collector of the transistor Q3, and the other end of the resistor R1 and the other end of the resistor R2 are connected to a power supply Vcc. The other end of the resistor R10 is connected to a drain of the main switch Q1 through a capacitor C1.

The ideal gate signal generation circuit 21 includes an inverter 211, an inverter 212, and a D-type flip-flop (DFF) 213. The inverter 211 inverts the bottom detection signal Btm from the collector of the transistor Q3, and outputs the inverted bottom detection signal Btm to a clock terminal CL of the DFF 213. The inverter 212 inverts the Q1 control signal Q1c from the control circuit 11, and outputs the inverted Q1 control signal Q1c to a reset terminal R of the DFF 213. To a terminal D of the DFF 213, the Q1 control signal Q1c from the control circuit 11 is inputted, and a terminal S is grounded. A DFF output from a terminal Q is outputted as the ideal gate signal IGs to the comparison circuit 22.

A truth table of the DFF 213 is shown in FIG. 7.

The comparison circuit 22 is formed of an exclusive-OR circuit (XOR) 221, and the XOR 221 takes an exclusive OR of the DFF output from the DFF 213 and the actual Q1 gate signal Q1g applied to the main switch Q1, and as the error output Cop, outputs the XOR output thus taken to the integration circuit 23.

The integration circuit 23 is formed by connecting a resistor R3 and a capacitor C3 in series to each other. One end of the resistor R3 is connected to an output of the XOR 221, one end of the capacitor C3 is grounded, and the integrated output Int is outputted from a connecting point of the capacitor C3 and the resistor R3 to a noninverting terminal + of an error amplifier 141 of the first delay circuit 14.

In the first delay circuit 14, a reference power supply Er is connected to an inverting terminal—of the error amplifier 141, and an output terminal of the error amplifier 141 is connected to an anode of a diode D3 through a resistor R4. A cathode of the diode D3 is connected to one end of a resistor R5 and one end of a capacitor C4, the other end of the resistor R5 is connected to the power supply Vcc, and the other end of the capacitor C4 is grounded. An output of the control circuit 11 is connected to a cathode of a diode D2 through a buffer 142, and an anode of the diode D2 is connected to the one end of the capacitor C4. A connecting point of the resistor R5 and the capacitor C4 is connected to the gate of the main switch Q1 and an input terminal of the XOR 221 through the low-side driver 16.

In the second delay circuit 15, an output of the inverter 12 is connected to a cathode of a diode D4 through a buffer 151, an anode of the diode D4 is connected to one end of a capacitor C5 and one end of a resistor R6, the other end of the resistor R6 is connected to the power supply Vcc, and the other end of the capacitor C5 is grounded. A connecting point of the resistor R6 and the capacitor C5 is connected to the gate of the auxiliary switch Q2 through the high-side driver 17.

Next, operations of the direct-current converter according to the second embodiment, which is thus configured, will be described.

First, when the Q1 control signal Q1c from the control circuit 11 rises to the H level at the time t1, the Q2 control signal Q2c falls to the L level. Accordingly, the Q2 gate signal Q2g falls to the L level, and therefore, the auxiliary switch Q2 is switched off.

Then, when the auxiliary switch Q2 is switched off, the voltage Q1v of the main switch Q1 is decreased during the period from the time t1 to a time t2. At this time, in the bottom detection circuit 13, a current flows through a route of the constituents D1, R10, C1, P1, Vin and GND, and the transistor Q3 is switched off. Therefore, the bottom detection signal Btm of the H level is outputted from the collector of the transistor Q3 to the inverter 211 in the ideal gate signal generation circuit 21. The bottom detection signal Btm is inverted by the inverter 211, falls to the L level, and is inputted to the clock terminal CL of the DFF 213. Moreover, a signal of the L level is inputted to the reset terminal R of the DFF 213, and a signal of the H level is inputted to the terminal D of the DFF 213. Therefore, the ideal gate signal IGs of the L level is outputted from the terminal Q of the DFF 213.

The XOR 221 takes an exclusive OR of the Q1 gate signal Q1g of the L level, which is applied to the main switch Q1, and the ideal gate signal IGs of the L level from the terminal Q of the DFF 213, and outputs the error output Cop of the L level to the one end of the resistor R3 of the integration circuit 23.

Next, when discharge of the capacitor C1 is finished and at the time t2, the voltage Q1v falls to the minimum value (bottom), a current flows through a route of the constituents Vin, P1, C1, R10 and Q3, and the transistor Q3 is switched on. Therefore, the minimum value (bottom) of the voltage Q1v is detected by the bottom detection circuit 13. At this time, the bottom detection signal Btm of the L level is outputted from the collector of the transistor Q3 to the inverter 211 in the ideal gate signal generation circuit 21. The bottom detection signal Btm is inverted by the inverter 211, and the inverted bottom detection signal of the H level is inputted to the clock terminal CL of the DFF 213. Therefore, the ideal gate signal IGs of the H level is outputted from the terminal Q of the DFF 213.

Hence, during the period from the time t2 to the time t21, the XOR 221 takes the exclusive OR of the Q1 gate signal Q1g of the L level, which is applied to the main switch Q1, and the ideal gate signal IGs of the H level from the terminal Q of the DFF 213, and outputs the error output Cop of the H level to the one end of the resistor R3 of the integration circuit 23. Accordingly, the integrated output Int from the connecting point of the resistor R3 and the capacitor C3 rises to the high voltage, and is inputted to the noninverting terminal + of the error amplifier 141, and therefore, a voltage in response to the value of the integrated output from the output of the error amplifier 141 is obtained. Therefore, by this voltage, a current flows through a route of the constituents R4, D3 and C4. Specifically, in the capacitor C4, a total current of the current from the resistor R5 and the current from the diode D3 flows, and accordingly, a charging time for the capacitor C4 is shortened.

Specifically, the charging time for the capacitor C4 is shortened in response to the value of the integrated output Int from the integration circuit 23, and thus the delay time from the rising time of the Q1 control signal Q1c to the rising time of the Q1 gate signal Q1g can be shortened. Hence, as already described with reference to the timing chart of FIG. 5, the control is performed for the delay of the rising time (ON time) of the actual Q1 gate signal Q1g, and thus the actual Q1 gate signal Q1g can approach the ideal gate signal IGs.

Next, at the time t21, the Q1 gate signal Q1g is applied to the gate of the main switch Q1 through the low-side driver 16, and accordingly, the main switch Q1 is switched on. Specifically, the bottom-voltage switch or zero-voltage switch of the main switch Q1 can be achieved.

When the main switch Q1 is switched on, a current flows from the direct-current power supply Vin to the main switch Q1 through the primary winding P1 of the transformer T. At this time, the current flows through a cycle of the constituents S1, D10, L10, C10 and S1.

Next, when the main switch Q1 is switched off by the Q1 control signal Q1c at the time t3, the parasitic capacitor (not shown) owned by the main switch Q1 is charged with the energy stored in the primary winding P1 of the transformer T and the leakage inductance between the primary and secondary windings of the transformer T, the voltage resonance is formed, and the voltage Q1v of the main switch Q1 rises during a period from the time t3 to the time t4. Moreover, the current flows through the cycle of the constituents L10, C10, D11 and L10, and supplied to the load R30.

Moreover, the Q2 control signal Q2c of the H level is inputted to the cathode of the diode D4 through the buffer 151, and accordingly, the diode D4 enters a reverse biased state. Therefore, the current flows from the power supply Vcc to the capacitor C5 through the resistor R6, and the capacitor C5 is charged therewith. Specifically, the Q2 gate signal Q2g in which the rising time is delayed by a delay time determined by a time constant of the resistor R6 and the capacitor C5 is generated by the second delay circuit 15.

Then, at the time t4, the Q2 gate signal Q2g is applied to the gate of the auxiliary switch Q2 through the high-side driver 17, and switches on the auxiliary switch Q2. Therefore, the energy stored in the primary winding P1 of the transformer T is supplied to the capacitor C2, and the capacitor C2 is charged therewith. Next, the energy stored in the capacitor C2 flows through the cycle of the constituents C2, Q2, P1 and C2.

As described above, also in the direct-current converter according to the second embodiment, a similar effect to the effect of the direct-current converter according to the first embodiment is obtained.

THIRD EMBODIMENT

Figure 8:
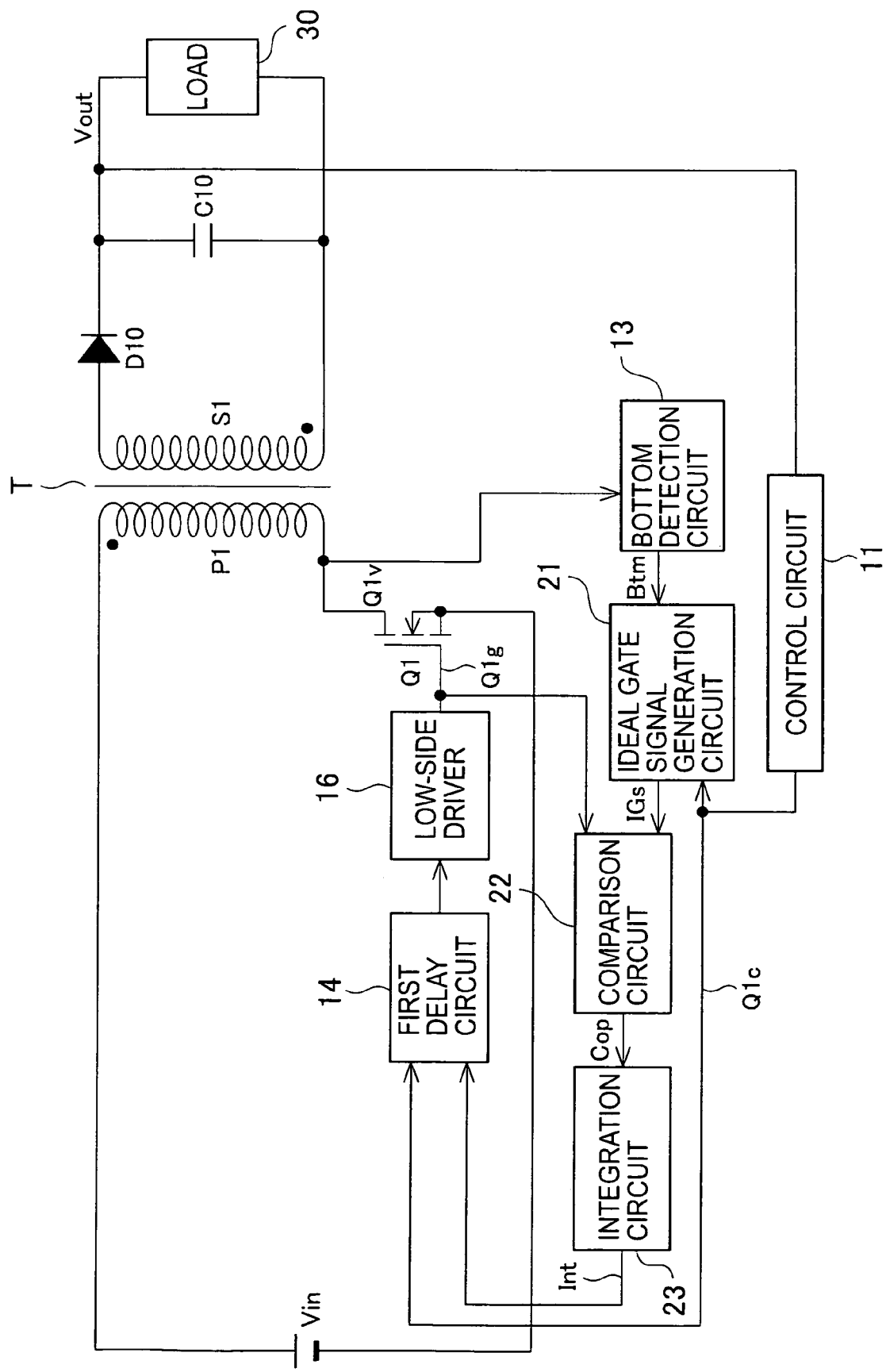
FIG. 8 is a circuitry diagram showing a direct-current converter according to a third embodiment.

FIG. 8 is a circuitry diagram of a direct-current converter according to a third embodiment. The direct-current converter according to the third embodiment, which is shown in FIG. 8, is one which obtains a direct-current output by switching on/off the main switch. The direct-current converter according to the third embodiment is characterized in that the auxiliary switch Q2, the inverter 12, the second delay circuit 15, the high-side driver 17, the capacitor C2, the diode D11 and the reactor L10 are deleted from the configuration of the direct-current converter according to the first embodiment, which is shown in FIG. 3. Moreover, the primary winding P1 and secondary winding S1 of the transformer T are wound in phases reverse to each other.

Other configurations shown in FIG. 8 are the same as the configurations of the constituent portions shown in FIG. 3. The same reference numerals are assigned to the same portions, and description thereof is omitted.

Next, operations of the direct-current converter according to the third embodiment, which is thus configured, will be described while referring to a timing chart shown in FIG. 9.

Figure 9:
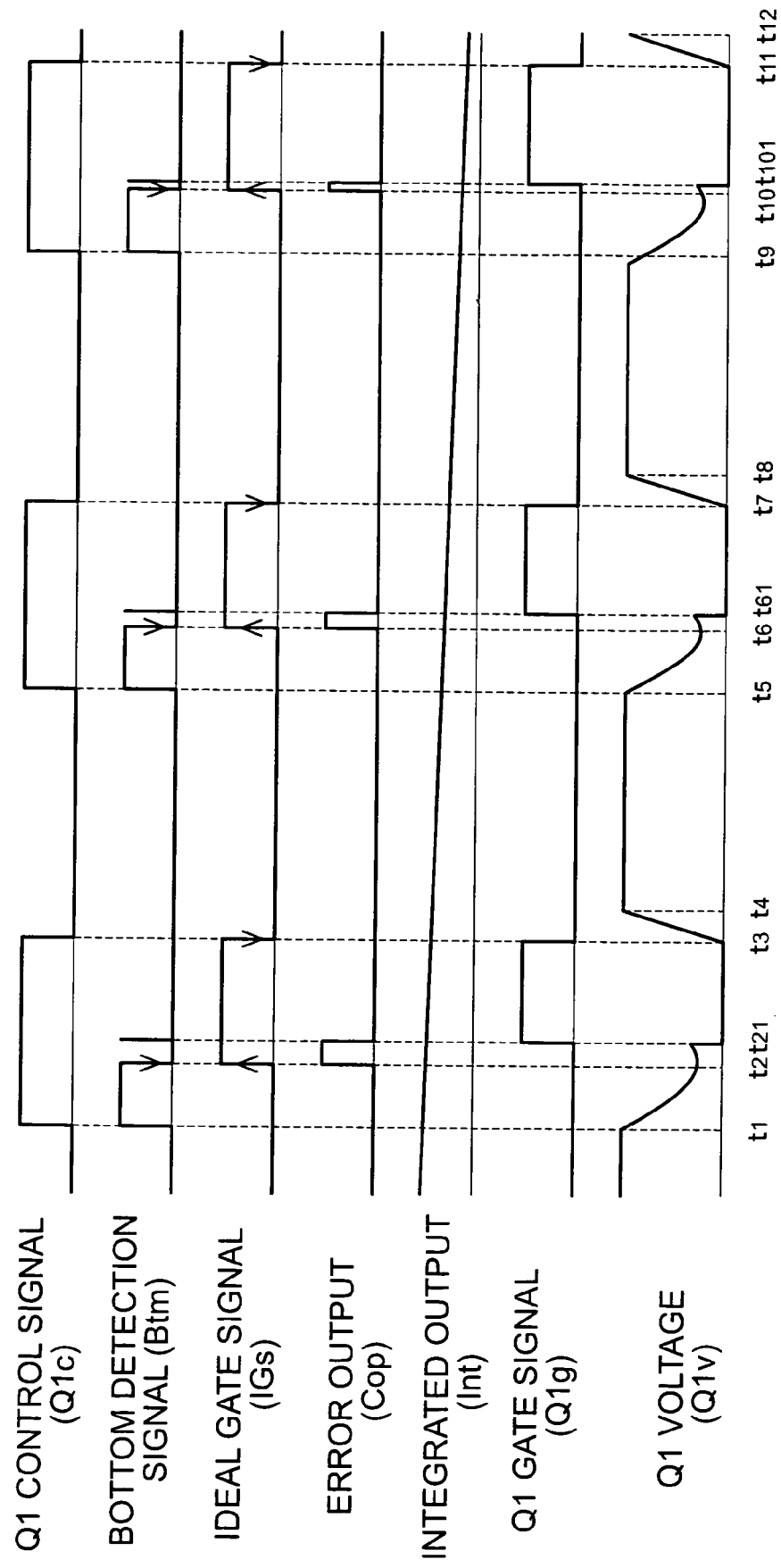
FIG. 9 is a timing chart of signals of respective portions during a transient state where an actual gate signal approaches an ideal gate signal owing to an error between the ideal gate signal and the actual gate signal in the direct-current converter according to the third embodiment.

As seen from the timing chart shown in FIG. 9, schematically, the timing chart concerned is similar to the timing chart shown in FIG. 5 except a portion relating to the auxiliary switch Q2.

At the time t3, the main switch Q1 is switched off by the Q1 control signal. At this time, the parasitic capacitor (not shown) owned by the main switch Q1 is charged with excited energy induced by the primary winding P1 of the transformer T, the voltage resonance is formed, and the voltage Q1v of the main switch Q1 rises during a period from the time t3 to the time t4.

Moreover, the energy is transmitted to the secondary side through a cycle of the constituents S1, D10, C10 and S1. When the energy induced in the transformer T is emitted through the cycle of the constituents S1, D10, C10 and S1 (when the transformer T is reset), the voltage Q1v of the main switch Q1 is decreased.

As described above, also in the direct-current converter according to the third embodiment, a similar effect to the effect of the direct-current converter according to the first embodiment is obtained.

Note that, though the series circuit composed of the auxiliary switch Q2 and the capacitor C2 is connected to both ends of the primary winding P1 of the transformer T in the first and second embodiments, for example, the series circuit may also be connected to both ends of the main switch Q1.

Moreover, though the direct-current power supply Vin is connected to the series circuit composed of the primary winding P1 of the transformer T and the main switch Q1 in the first to third embodiments, for example, a rectified voltage unit which obtains a rectified voltage by rectifying an alternating-current voltage of an AC power supply may also be connected to the series circuit concerned.

Furthermore, though only the parasitic capacitor is provided in the main switch Q1 in the first to third embodiments, another capacitor may also be connected to both ends of the main switch Q1.

INDUSTRIAL APPLICABILITY

According to the present invention, the unstableness of the operations owing to the error of the bottom detection circuit and the fluctuations of the detection point which are caused by the disturbance can be improved, and the stable operations can be obtained. Moreover, the influence of the delay from the detection of the bottom to the switch-on of the main switch can be eliminated, and accordingly, it is not necessary to switch on the main switch at high speed, and the switching noise can be reduced.

The invention claimed is:

1. A direct-current converter which alternately switches on/off a main switch and an auxiliary switch, thereby rectifying and smoothing a voltage of a secondary winding of a transformer, thus obtaining a direct-current output, the main switch being connected in series to a primary winding of the transformer, and the auxiliary switch being of a series circuit connected to both ends of the primary winding of the transformer or both ends of the main switch and composed of a capacitor and the auxiliary switch, comprising:

bottom detection means configured to detect a minimum voltage of the main switch after the auxiliary switch is switched off;

control signal generation means configured to generate an ideal control signal which switches on the main switch at a time of the minimum voltage of the main switch based on an output of the bottom detection means;

error calculation means configured to calculate an error output between the ideal control signal generated by the control signal generation means and an actual control signal which switches on the main switch; and delay control means configured to control a delay of an ON time of the main switch by the actual control signal based on the error output of the error calculation means, thereby performing control to make the actual control signal approach the ideal control signal.

2. The direct-current converter according to claim 1, further comprising: integration means configured to integrate the error output of the error calculation means, wherein the delay control means controls the delay of the ON time of the actual control signal based on an integrated output of the integration means, thereby performing the control to make the actual control signal approach the ideal control signal.

3. The direct-current converter according to claim 2, wherein the delay control means comprises:

a delay unit which delays a signal switching on the main switch, the signal being from the control means, by a predetermined time by means of a charging time for a delaying capacitor connected in series to a resistor; and a variable delay unit which applies a difference voltage between the integrated output of the integration means and a reference voltage to the delaying capacitor, thereby shortening the predetermined delay time in response to the difference voltage, and the delay control means applies the actual control signal to a control terminal of the main switch based on a voltage of the delaying capacitor.

4. The direct-current converter according to claim 1, wherein a direct-current power supply or a rectified voltage unit which obtains a rectified voltage by rectifying an alternating-current voltage of an AC power supply is connected to both ends of a series circuit composed of the primary winding of the transformer and the main switch.

5. A direct-current converter which switches on/off a main switch connected in series to a primary winding of a transformer, thereby rectifying and smoothing a voltage of a secondary winding of the transformer, thus obtaining a direct-current output, comprising:

bottom detection means configured to detect a minimum voltage of the main switch when a voltage of the main switch is decreased;

control signal generation means configured to generate an ideal control signal which switches on the main switch at a time of the minimum voltage of the main switch based on an output of the bottom detection means;

error calculation means configured to calculate an error output between the ideal control signal generated by the control signal generation means and an actual control signal which switches on the main switch; and delay control means configured to control a delay of an ON time of the main switch by the actual control signal based on the error output of the error calculation means, thereby performing control to make the actual control signal approach the ideal control signal.

6. The direct-current converter according to claim 5, further comprising: integration means configured to integrate the error output of the error calculation means, wherein the delay control means controls the delay of the ON time of the actual control signal based on an integrated output of the integration means, thereby performing the control to make the actual control signal approach the ideal control signal.

7. The direct-current converter according to claim 6, wherein the delay control means comprises:

a delay unit which delays a signal switching on the main switch, the signal being from the control means, by a predetermined time by means of a charging time for a delaying capacitor connected in series to a resistor; and a variable delay unit which applies a difference voltage between the integrated output of the integration means and a reference voltage to the delaying capacitor, thereby shortening the predetermined delay time in response to the difference voltage, and the delay control means applies the actual control signal to a control terminal of the main switch based on a voltage of the delaying capacitor.

8. The direct-current converter according to claim 5, wherein a direct-current power supply or a rectified voltage unit which obtains a rectified voltage by rectifying an alternating-current voltage of an AC power supply is connected to both ends of a series circuit composed of the primary winding of the transformer and the main switch.

* * * * *